United States Patent
Okamoto et al.

(10) Patent No.: US 7,772,153 B2
(45) Date of Patent: Aug. 10, 2010

(54) SEPARATING AGENT FOR ENANTIOMERIC ISOMERS

(75) Inventors: Yoshio Okamoto, Aichi (JP); Chiyo Yamamoto, Aichi (JP)

(73) Assignee: Daicel Chemical Industries, Ltd., Sakai-Shi, Osaka (JP)

( * ) Notice: Subject to any disclaimer, the term of this patent is extended or adjusted under 35 U.S.C. 154(b) by 1162 days.

(21) Appl. No.: 10/551,681

(22) PCT Filed: Apr. 22, 2004

(86) PCT No.: PCT/JP2004/005757

§ 371 (c)(1),
(2), (4) Date: Sep. 29, 2005

(87) PCT Pub. No.: WO2004/095018

PCT Pub. Date: Nov. 4, 2004

(65) Prior Publication Data

US 2006/0189796 A1    Aug. 24, 2006

(30) Foreign Application Priority Data

Apr. 24, 2003    (JP) .............................. 2003-119326

(51) Int. Cl.
*B01J 20/00* (2006.01)

(52) U.S. Cl. ...................................... 502/404; 502/400
(58) Field of Classification Search ................. 502/400, 502/404
See application file for complete search history.

(56) References Cited

U.S. PATENT DOCUMENTS

| 4,539,399 | A | 9/1985 | Armstrong |
| 5,030,354 | A | 7/1991 | Miwa et al. |
| 5,089,642 | A | 2/1992 | Hasegawa et al. |
| 5,302,633 | A | 4/1994 | Kimata et al. |
| 5,587,467 | A | 12/1996 | Murakami et al. |
| 5,679,572 | A | 10/1997 | Okamoto et al. |
| 5,734,043 | A | 3/1998 | Murakami et al. |
| 6,736,967 | B2 * | 5/2004 | Ohnishi et al. ............ 210/198.2 |

FOREIGN PATENT DOCUMENTS

| EP | 1 500 430 | 1/2005 |
| JP | 62-270602 | 11/1987 |
| JP | 04-202141 | 7/1992 |
| JP | 06-329561 | 11/1994 |
| JP | 07-138301 | 5/1995 |
| JP | 07-309784 | 11/1995 |
| JP | 08-059702 | 3/1996 |
| JP | 11-255671 | 9/1999 |
| JP | 2002-350413 | 12/2002 |

OTHER PUBLICATIONS

Useful Chiral Packing Materials for High-Performance Liquid Chromatographic Resolution of Enantiomers: Phenylcarbamates of Polysaccharides Coated on Silica Gel, by Y. Okamoto et al, J. Am. Chem. Soc., 106, 5357-5359, 1984.

* cited by examiner

Primary Examiner—Edward M Johnson
(74) Attorney, Agent, or Firm—Flynn, Thiel, Boutell & Tanis, P.C.

(57) ABSTRACT

The present invention provides a separating agent for enantiomeric isomers which exhibits high optical resolving power together with solvent resistance. That is, the present invention provides a separating agent for enantiomeric isomers including a polysaccharide derivative such as a carbamate derivative or ester derivative of cellulose or amylose carried on a porous carrier such as silica gel, in which the porous carrier having an epoxy group and part of the hydroxyl groups of the polysaccharide derivative are chemically bonded.

8 Claims, No Drawings

SEPARATING AGENT FOR ENANTIOMERIC ISOMERS

TECHNICAL FIELD TO WHICH THE INVENTION BELONGS

The present invention relates to a separating agent for enantiomeric isomers, and to a method of producing the same.

PRIOR ART

It is hereto known that polysaccharides or derivatives thereof such as ester or carbamate derivatives of cellulose or amylose exhibit high optical resolving power. It is further known that separating agents for chromatography having the polysaccharides or derivatives thereof physically adsorbed and carried on silica gel are excellent separating agents exhibiting optical resolving power in a wide range, a large theoretical plate number and high durability (Y. Okamoto, M. Kawashima, and K. Hatada, J. Am. Chem. Soc., 106, 5357, 1984).

However, the separating agents can be used only under restricted separation conditions, since the polysaccharide derivatives are carried by silica gel through physical adsorption. Thus, solvents for dissolving the polysaccharide derivatives cannot be used as mobile phases and the like.

Further, solvents for dissolving samples are restricted. A sample having low solubility in the solvents that can be used as the mobile phase causes a serious problem particularly in chromatographic separation and collection. Moreover, there is another problem in that only limited washing fluids can be used in washing away contaminants strongly adsorbed on the separating agents.

In consideration of those points, a separating agent having a polysaccharide derivative carried thereon and having a high solvent resistance has been strongly required.

In order to solve such problems, there has been proposed a method of imparting solvent resistance to a polysaccharide derivative such as: a method of chemically bonding a polysaccharide derivative to silica gel directly; a method of crosslinking polysaccharide derivatives; and a method combining the above-described methods (JP-A-62-270602, JP-A-04-202141, JP-A-06-329561, JP-A-07-309784, JP-A-07-138301, and JP-A-08-59702).

However, those methods have problems in that a substitution group of the polysaccharide derivative is used for chemical bonding or a crosslinking reaction, thereby causing defects in a regulated structure of the polysaccharide derivative and inhibiting the exhibition of high optical resolving power inherent in the polysaccharide derivative.

DISCLOSURE OF THE INVENTION

It is an object of the present invention to provide a separating agent for enantiomeric isomers capable of exhibiting high optical resolving power inherent in a polysaccharide derivative together with sufficient solvent resistance, and a method of producing the same.

As means for achieving the object, the present invention provides a separating agent for enantiomeric isomers, including a polysaccharide derivative carried on a porous carrier, in which the porous carrier has an epoxy group and the epoxy group and part of the hydroxyl groups of the polysaccharide derivative are chemically bonded.

As other means for achieving the object, the present invention provides a method of producing the separating agent for enantiomeric isomers, including the step of chemically bonding a porous carrier having an epoxy group and a polysaccharide derivative having hydroxyl groups by reacting the porous carrier and the polysaccharide derivative in an organic solvent under heating.

As still other means for achieving the object, the present invention provides a method of producing the separating agent for enantiomeric isomers, including the steps of: chemically bonding an epoxy group of a porous carrier and hydroxyl groups of a polysaccharide derivative by reacting the porous carrier having the epoxy group and the polysaccharide derivative having the hydroxyl groups in an organic solvent under heating; and reacting the hydroxyl groups of a product formed in the previous step and a compound having a functional group which may react with the hydroxyl groups.

The present invention relates to the use of a substance, as a separating agent for enantiomeric isomers, which has a polysaccharide derivative carried on a porous carrier, in which: the porous carrier has an epoxy group; and the epoxy group and part of the hydroxyl groups of the polysaccharide derivative are chemically bonded.

The present invention relates to a method of separating enantiomeric isomers by using a substance which has a polysaccharide derivative carried on a porous carrier, in which: the porous carrier has an epoxy group; and the epoxy group and part of hydroxyl groups of the polysaccharide derivative are chemically bonded.

DETAILED DESCRIPTION OF THE INVENTION

A separating agent for enantiomeric isomers according to the present invention includes a polysaccharide derivative carried on a porous carrier through chemical bonding.

A polysaccharide derivative to be used may have an ester bond, a urethane bond, an ether bond, or the like formed by reacting at least part of (but not all) the hydroxyl groups of a polysaccharide with a compound having a functional group capable of reacting with the hydroxyl groups. In particular, the polysaccharide derivative to be used is preferably a polysaccharide carbamate derivative or a polysaccharide ester derivative.

The polysaccharide may be any of a synthetic polysaccharide, a natural polysaccharide, or a modified natural polysaccharide as long as the polysaccharide is optically active. However, the polysaccharide preferably has a highly regulated bonding pattern.

Examples of the polysaccharide include: $\beta$-1,4-glucan (cellulose); $\alpha$-1,4-glucan (amylose or amylopectin); $\alpha$-1,6-glucan (dextran); $\beta$-1,6-glucan (pustulan); $\beta$-1,3-glucan (such as curdlan or schizophyllan); $\alpha$-1,3-glucan; $\beta$-1,2-glucan (Crown Gall polysaccharide); $\beta$-1,4-galactan; $\beta$-1,4-mannan; $\alpha$-1,6-mannan; $\beta$-1,2-fructan (inulin); $\beta$-2,6-fructan (levan); $\beta$-1,4-xylan; $\beta$-1,3-xylan; $\beta$-1,4-chitosan; $\alpha$-1,4-N-acetylchitosan (chitin); pullulan; agarose; alginic acid; and starch containing amylose.

Of those, cellulose, amylose, $\beta$-1,4-xylan, $\beta$-1, 4-chitosan, chitin, $\beta$-1,4-mannan, inulin, curdlan, and the like are preferable because they are easily available high purity polysaccharides. Cellulose and amylose are particularly preferable.

The number-average degree of polymerization of the polysaccharide (average number of pyranose rings or furanose rings in a molecule) is 5 or more, and preferably 10 or more. The number-average degree of polymerization thereof has no upper limit, but is desirably 1,000 or less from a viewpoint of easy handling.

The porous carrier has an epoxy group and may be obtained by introducing an epoxy group into a porous organic carrier or a porous inorganic carrier. The porous carrier is preferably a porous inorganic carrier having an epoxy group incorporated thereinto.

Appropriate examples of the porous organic carrier include polymer substances such as polystyrene, polyacrylamide, and polyacrylate. Appropriate examples of the porous inorganic carrier include silica, alumina, magnesia, glass, kaolin, titanium oxide, a silicate, and hydroxyapatite.

A particularly preferable carrier is silica gel, and silica gel has a particle size of 0.1 μm to 10 μm, preferably 1 μm to 300 μm, more preferably 1 μm to 100 μm, and particularly preferably 1 μm to 75 μm. Silica gel has an average pore size of 10 Å to 100 mm, and preferably 50 Å to 50,000 Å. Silica gel is preferably subjected to surface treatment for eliminating an effect of remaining silanol on its surface, but needs not be subjected to surface treatment at all.

The bonding ratio of the polysaccharide derivative is preferably 1 to 50 parts by mass, more preferably 1 to 20 parts by mass, and particularly preferably 1 to 10 parts by mass with respect to 100 parts by mass of the separating agent for enantiomeric isomers. The term "bonding ratio of the polysaccharide derivative" as used herein refers to the ratio of the polysaccharide derivative to the separating agent for enantiomeric isomers.

Next, description will be given of a method of producing the separating agent for enantiomeric isomers of the present invention including the polysaccharide derivative carried on the porous carrier through chemical bonding.

In a first step, a porous carrier having an epoxy group and a polysaccharide derivative having hydroxyl groups are reacted in an organic solvent under heating, to thereby chemically bond the epoxy group of the porous carrier and the hydroxyl groups of the polysaccharide derivative.

Specific examples of a method for the step that can be employed include:

(1) a method involving addition of a solution (such as a pyridine solution) of a polysaccharide derivative to a porous carrier having an epoxy group, and stirring the whole under heating; and (2) a method involving carrying of a polysaccharide derivative on a porous carrier having an epoxy group by physical adsorption means, addition of a solvent (such as chloroform or toluene) thereto, and stirring of the whole under heating.

In each of the methods (1) and (2), a compound (such as $BF_3 \cdot Et_2O$ (ethyl ether)) catalyzing a bonding reaction between the epoxy group on the porous carrier and the hydroxyl groups on the polysaccharide derivative may be added to a reaction system.

The method of producing the separating agent for enantiomeric isomers of the present invention may further include as required the step of reacting hydroxyl groups of a product formed in the above-described step and a compound having a functional group which may react with the hydroxyl groups.

The product formed in the above-described step contains: hydroxyl groups of the polysaccharide derivative uninvolved in a chemical bonding between the porous carrier having an epoxy group and the polysaccharide derivative; and a hydroxyl group newly formed through ring opening of the epoxy group.

Derivatization is performed through a known method involving formation of an ester bond, a urethane bond, an ether bond, or the like using the hydroxyl groups and the compound having a functional group which may react with hydroxyl groups.

Examples of the compound having a functional group which may react with hydroxyl groups that may be used include: an isocyanic acid derivative; a carboxylic acid; an ester; an acid halide; a halide; an epoxy compound; an aldehyde; an alcohol; and a compound having a leaving group such as an aliphatic acid, an alicyclic compound, an aromatic compound, or a hetero aromatic compound.

The separating agent for enantiomeric isomers of the present invention can be used as a stationary phase for chromatography. The separating agent for enantiomeric isomers of the present invention can be used for gas chromatography, liquid chromatography, thin-layer chromatography, electrophoresis, and the like. In particular, the separating agent for enantiomeric isomers of the present invention is preferably used for (continuous) liquid chromatography, thin-layer chromatography, and electrophoresis. The separating agent for enantiomeric isomers of the present invention may be not only used as a separating agent for chromatography, but also applied as a host/guest separating agent, and for membrane separation and liquid crystal materials.

The separating agent for enantiomeric isomers of the present invention, a stationary phase for chromatography using the same, and a stationary phase for continuous liquid chromatography using the same are suitable for enantiomeric isomers analysis technique involving optical separation of a wide range of chiral compounds at high separation factors in the analysis of drugs, food products, agricultural chemicals, and fragrance materials.

The separating agent for enantiomeric isomers of the present invention includes the porous carrier and the polysaccharide derivative chemically bonded thereto, and thus expands the range of selection of a solvent used as a mobile phase when the separating agent for enantiomeric isomers is used as a stationary phase for chromatography.

Further, the separating agent for enantiomeric isomers of the present invention includes the porous carrier and the polysaccharide derivative chemically bonded with each other through an epoxy group introduced into the porous carrier and therefore it is capable of exhibiting high optical resolving power inherent in the polysaccharide derivative. It has no defects often appearing in a regulated structure of the polysaccharide derivative as in conventional techniques.

EXAMPLES

Hereinafter, the present invention will be described in more detail by way of examples, but the present invention is not limited to the examples.

Synthesis Example 1

Synthesis of polysaccharide derivative 1 (6-O-tritylcellulose) represented by the following formula

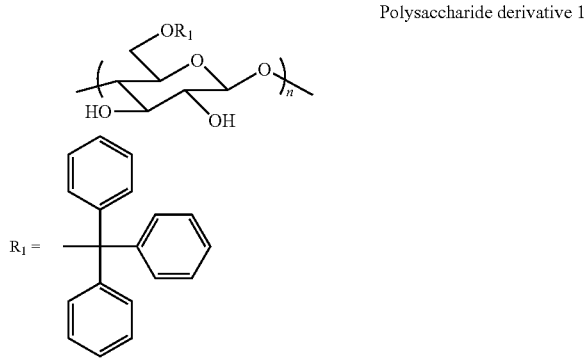

Polysaccharide derivative 1

Into a 500-ml three-necked flask, cellulose (5.03 g, 31 mmol), LiCl (3.40 g, 81 mmol), and N,N-dimethylacetamide (50 ml) were added, and the mixture was swollen at 80° C. for several hours. Then, trityl chloride (38.3 g, 137 mmol) and pyridine (100 ml) were added to the mixture and a reaction was carried out for 12 hours. A product was reprecipitated in methanol and collected through centrifugation.

Synthesis Example 2

Synthesis of polysaccharide derivative 2 [2,3-bis(3,5-dimethylphenyl carbamate)cellulose] represented by the following formula

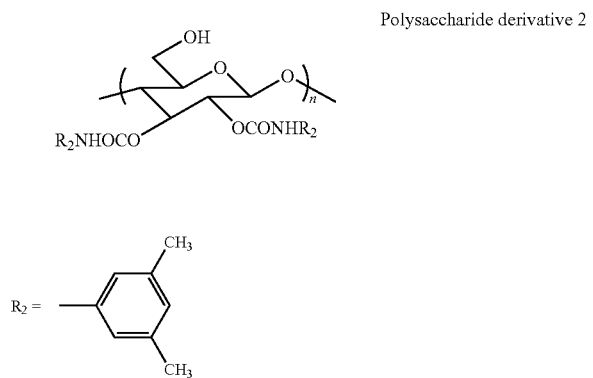

Polysaccharide derivative 2

The polysaccharide derivative 1 (1.08 g, 2.67 mmol) and pyridine (15 ml) were added, and then 3,5-dimethylphenyl isocyanate (1.59 g, 10.7 mmol) was added. A reaction was carried out at 80° C. for 18 hours to thereby convert hydroxyl groups at 2- and 3-positions to carbamates. The obtained precipitate was reprecipitated in methanol and was washed with methanol through centrifugation until pyridine was completely removed. Then, a protecting group of a hydroxyl group at a 6-position was removed by using an acid (HCl/methanol=1/50). A product was sufficiently washed with methanol and collected through centrifugation.

Synthesis Example 3

Synthesis of porous carrier 1 (silica gel having an epoxy group introduced thereinto) represented by the following formula

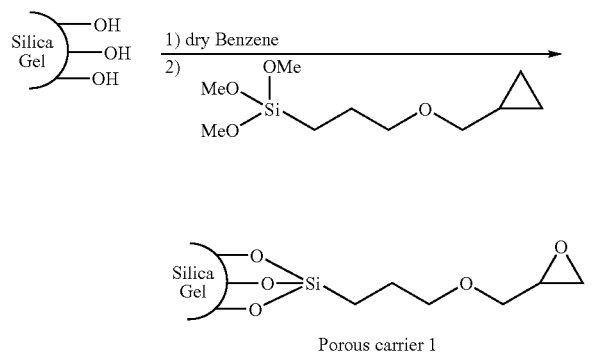

Porous carrier 1

Benzene (80 ml), (3-glycidoxypropyl)trimethoxysilane (4 ml), and pyridine (0.2 ml) were added to 8.1 g of silica gel (particle size of 7 μm, pore size of 1,000 Å). A reaction was carried out at 80° C. for 17 hours. A product was sufficiently washed with methanol, acetone, and hexane in the order given, and was collected through a 4G-glass filter. An introduction ratio of the epoxy group was determined by measuring a content of an organic substance through thermogravimetric analysis.

Example 1

Synthesis of separating agent for enantiomeric isomers 4-1 (separating agent prepared by chemically bonding an epoxy group of the porous carrier 1 and part of hydroxyl groups of the polysaccharide derivative 2, without a catalyst) represented by the following formula

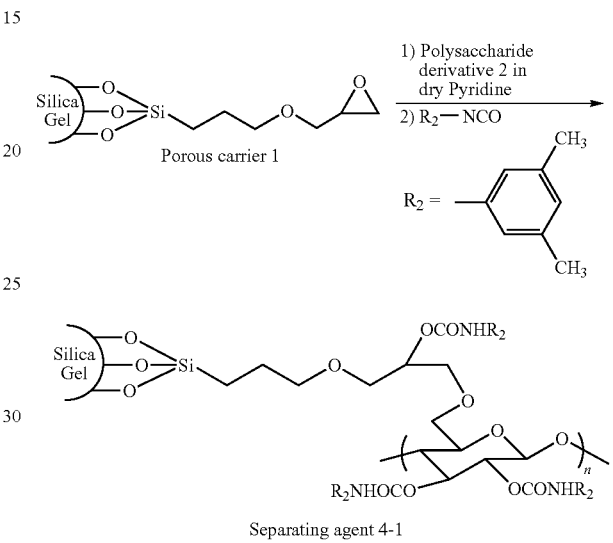

Separating agent 4-1

A pyridine solution of the polysaccharide derivative 2 (0.26 g) was added to the porous carrier 1 (1.02 g). A reaction was carried out at 70° C. for 92 hours for fixing the polysaccharide derivative 2. Then, unreacted hydroxyl groups of the derivative and a hydroxyl group formed through ring opening of the epoxy group were converted into phenyl carbamates. The obtained separating agent was collected through a 4G-glass filter and sufficiently washed with pyridine and THF. Then, the separating agent was filled into a column [25×0.20 cm (i.d.)] through a slurry method. Note that, a bonding ratio of the polysaccharide derivative (ratio of the polysaccharide derivative to the separating agent for enantiomeric isomers) of the obtained filler was determined through: thermogravimetric analysis of the filler; and calculation by using the following equation.

Bonding ratio of polysaccharide=[(Weight of organic substance in finally obtained filler)−(Weight of organic substance in functional group-introduced silica gel before addition of polysaccharide derivative)]/(Total weight of filler)

Example 2

Synthesis of separating agent for enantiomeric isomers 4-2 (separating agent prepared by chemically bonding an epoxy group of the porous carrier 1 and part of hydroxyl groups of the polysaccharide derivative 2, with a catalyst) represented by the following formula

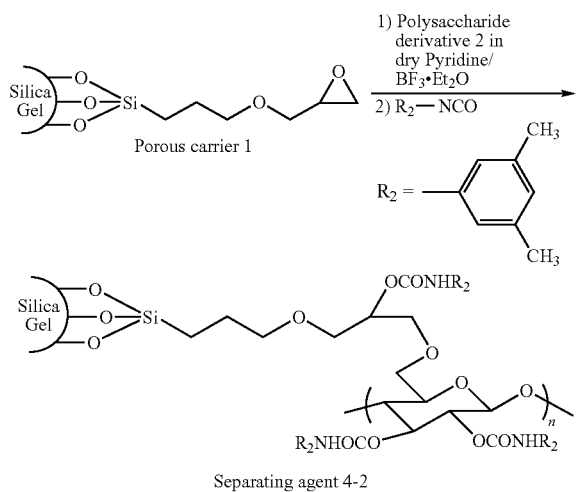

Separating agent 4-2

A pyridine solution of the polysaccharide derivative 2 (0.25 g) and a catalyst $BF_3 \cdot Et_2O$ (2 μl) were added to the porous carrier 1 (1.00 g). A reaction was carried out at 80° C. for 25 hours. Then, unreacted hydroxyl groups of the derivative and a hydroxyl group formed through ring opening of the epoxy group were converted into phenyl carbamates. The obtained separating agent was collected through a 4G-glass filter and sufficiently washed with pyridine and THF. Then, the separating agent was filled into a column [25×0.20 cm (i.d.)] through a slurry method. Note that, a bonding ratio of the polysaccharide derivative (ratio of the polysaccharide derivative to the separating agent for enantiomeric isomers) of the obtained filler was calculated in the same manner as in Example 1.

Example 3

Synthesis of separating agent for enantiomeric isomers 4-3 (separating agent prepared by coating the porous carrier 1 with the polysaccharide derivative 1 in advance and chemically bonding the polysaccharide derivative 1 and the porous carrier 1 in chloroform, with a catalyst)

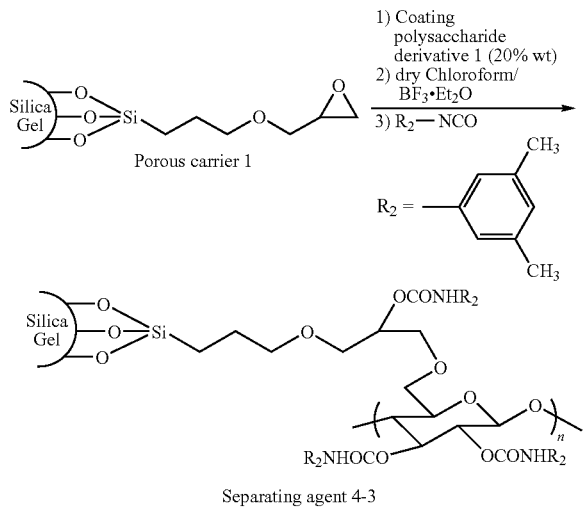

Separating agent 4-3

1.11 g of a substance having 20 wt % polysaccharide derivative 1 carried on the porous carrier 1 was left standing in chloroform at 60° C. for 3 hours. Then, $BF_3 \cdot Et_2O$ (1 μl) was added thereto. A reaction was carried out for 38 hours to thereby convert unreacted hydroxyl groups of the polysaccharide derivative 1 and a hydroxyl group formed through ring opening of the epoxy group into phenyl carbamates. The obtained separating agent was collected through a 4G-glass filter and sufficiently washed with pyridine and THF. Then, the separating agent was filled into a column [25×0.20 cm (i.d.)] through a slurry method. Note that, a bonding ratio of the polysaccharide derivative (ratio of the polysaccharide derivative to the separating agent for enantiomeric isomers) of the obtained filler was calculated in the same manner as in Example 1.

Example 4

Synthesis of separating agent 4-4 (separating agent prepared by coating the porous carrier 1 with the polysaccharide derivative 1 in advance and chemically bonding the polysaccharide derivative 1 and the porous carrier 1 in toluene, with a catalyst)

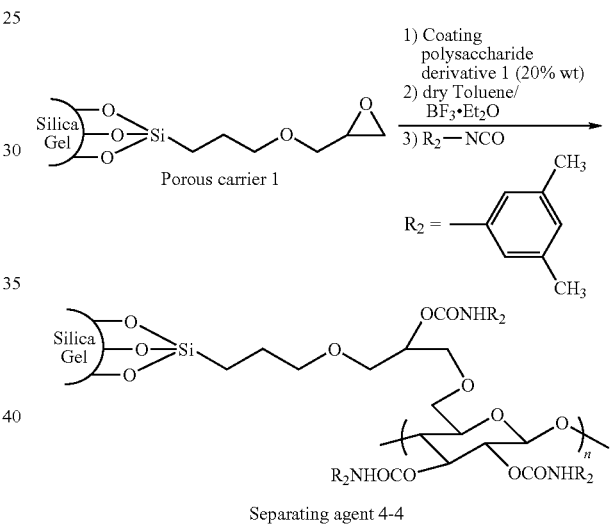

Separating agent 4-4

1.14 g of a substance having 20 wt % of polysaccharide derivative 1 carried on the porous carrier 1 was left standing in toluene at 80° C. for 3 hours. Then, $BF_3 \cdot Et_2O$ (1 μl) was added thereto. A reaction was carried out for 38 hours, to thereby convert unreacted hydroxyl groups of the derivative and a hydroxyl group formed through ring opening of the epoxy group into phenyl carbamates. The obtained separating agent was collected through a 4G-glass filter and sufficiently washed with pyridine and THF. Then, the separating agent was filled into a column [25×0.20 cm (i.d.)] through a slurry method. Note that, a bonding ratio of the polysaccharide derivative (ratio of the polysaccharide derivative to the separating agent for enantiomeric isomers) of the obtained filler was calculated in the same manner as in Example 1.

Comparative Example 1

Synthesis of separating agent 5 (separating agent prepared by chemically bonding through diisocyanate silica gel having an amino group introduced thereinto and part of hydroxyl groups at 2- and 3-positions of the polysaccharide derivative 1) represented by the following formula

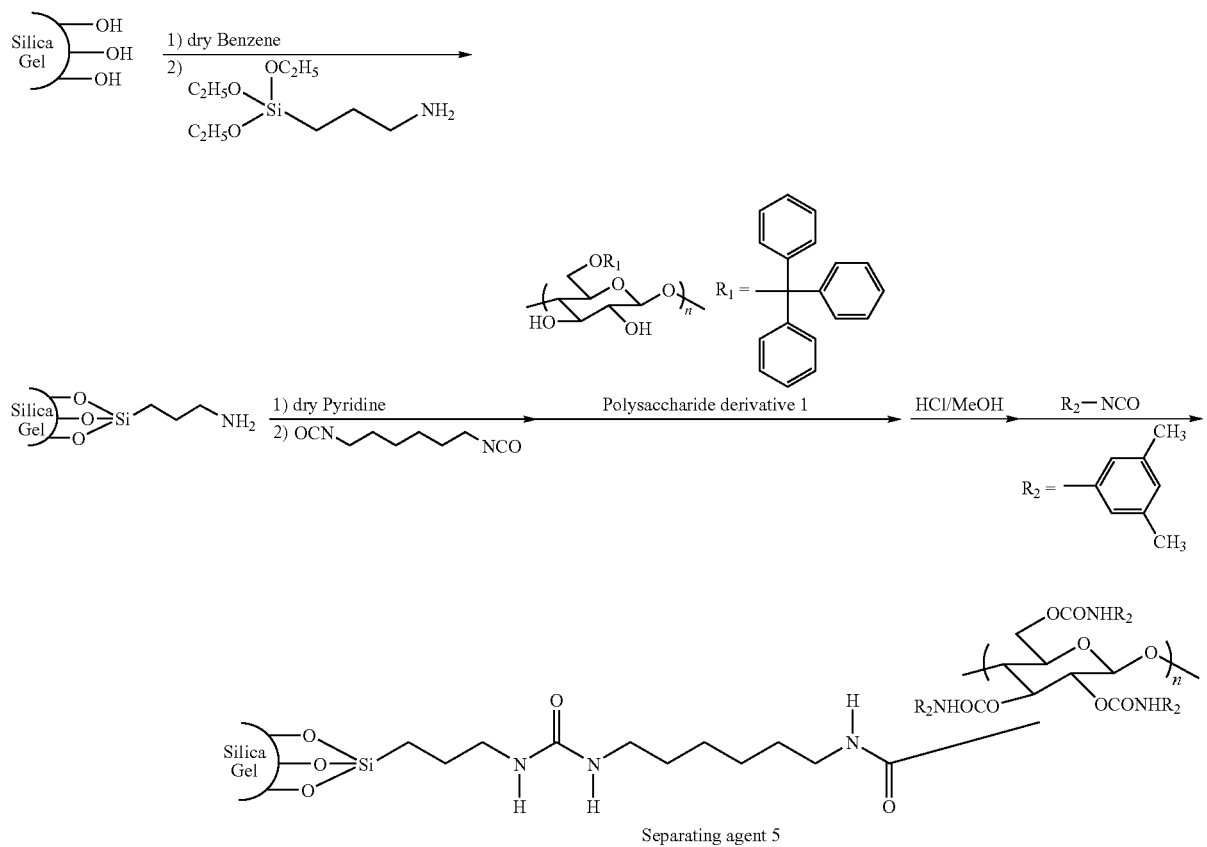

Benzene (100 ml), (3-aminopropyl)triethoxysilane (2 ml), and pyridine (0.8 ml) were added to 10.1 g of silica gel (particle size of 7 μm, pore size of 1,000 Å). A reaction was carried out at 80° C. for 12 hours. A product was sufficiently washed with methanol, acetone, and hexane in the order given, and was collected through a 4G-glass filter.

Hexamethylene diisocyanate (0.15 ml, 0.94 mmol) and pyridine (10 ml) were added to the obtained surface treated silica gel (1.00 g). A reaction was carried out at 80° C. for 12 hours to thereby introduce an isocyanate group into silica gel. An introduction ratio of the isocyanate group in silica gel was determined by: sampling a small amount of silica gel; precipitating the sampled silica gel in methanol; performing thermogravimetric analysis of the obtained precipitate; and calculating the introduction ratio in the same manner as in Synthesis Example 3.

Then, a pyridine solution of the polysaccharide derivative 1 (0.18 g) was added to the resultant for fixing the polysaccharide derivative 1. An operation of taking out a supernatant and adding pyridine again was repeated several times, to thereby remove unreacted hexamethylene diisocyanate.

Then, a protecting group was removed by using an acid (HCl/methanol=1/50), and 3,5-dimethylphenyl isocyanate was added, to thereby convert unreacted hydroxyl groups into phenyl carbamates.

The obtained separating agent 5 was collected through a 4G-glass filter and sufficiently washed with pyridine and THF. Then, the separating agent was filled into a column [25×0.20 cm (i.d.)] through a slurry method. Note that, a bonding ratio of the polysaccharide derivative (ratio of the polysaccharide derivative to the separating agent for enantiomeric isomers) of the obtained filler was determined through thermogravimetric analysis of the filler and calculation in the same manner as in Example 1.

Comparative Example 2

Synthesis of separating agent 6 (separating agent prepared by chemically bonding through diisocyanate silica gel having an amino group introduced thereinto and part of a hydroxyl group at a 6-position of the polysaccharide derivative 2) represented by the following formula

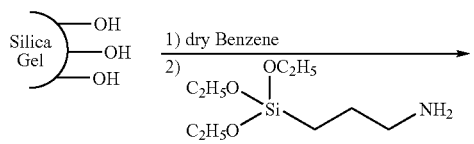

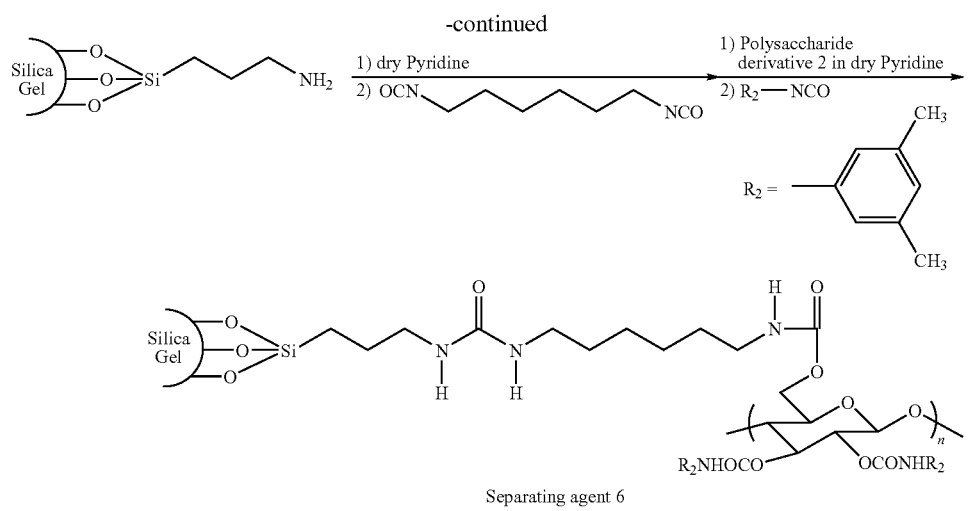

Separating agent 6

Benzene (100 ml), (3-aminopropyl)triethoxysilane (2 ml), and pyridine (0.8 ml) were added to 10.1 g of silica gel (particle size of 7 μm, pore size of 1,000 Å). A reaction was carried out at 80° C. for 12 hours. A product was sufficiently washed with methanol, acetone, and hexane in the order given, and was collected through a 4G-glass filter.

Hexamethylene diisocyanate (0.05 ml, 0.31 mmol) and pyridine (10 ml) were added to the obtained surface treated silica gel (1.01 g). A reaction was carried out at 80° C. for 44 hours to thereby introduce an isocyanate group into silica gel. An introduction ratio of the isocyanate group in silica gel was determined by: sampling a small amount of silica gel; precipitating the sampled silica gel in methanol; performing thermogravimetric analysis of the obtained precipitate; and calculating the introduction ratio in the same manner as in Synthesis Example 3. Then, a pyridine solution of the polysaccharide derivative 2 was added to the resultant for fixing the polysaccharide derivative 2, to thereby eventually convert unreacted hydroxyl groups into phenyl carbamates.

The obtained separating agent 6 was collected through a 4G-glass filter and sufficiently washed with pyridine and THF. Then, the separating agent was filled into a column [25×0.20 cm (i.d.)] through a slurry method. Note that, a bonding ratio of the polysaccharide derivative (ratio of the polysaccharide derivative to the separating agent for enantiomeric isomers) of the obtained filler was determined through thermogravimetric analysis of the filler and calculation in the same manner as in Example 1.

Application Example 1

The separating agents 4-1 to 4-4 obtained in the Examples and the separating agents 5 and 6 obtained in the Comparative Examples were used, to thereby measure the optical resolving power (separation factor α) of each of the separating agents on the following various racemic modifications by means of HPLC. Table 1 shows the results.

TABLE 1

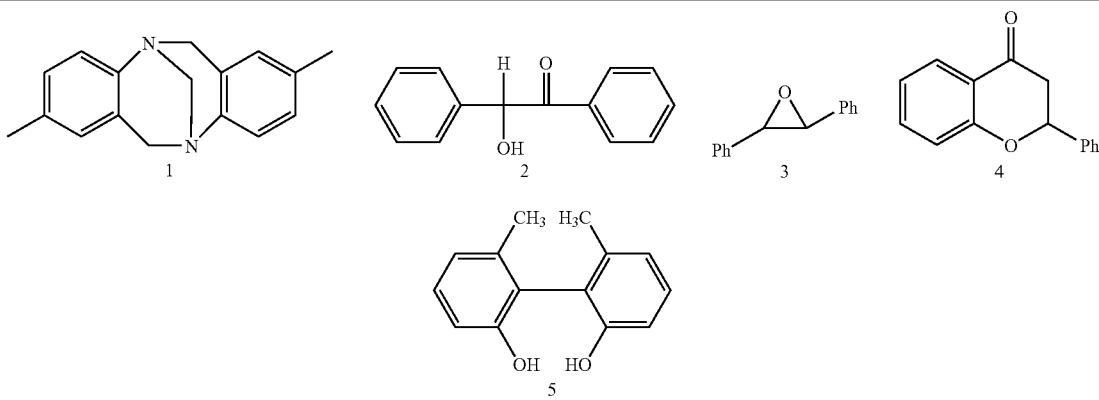

| | Ex. 1 | Ex. 2 | Ex. 3 | Ex. 4 | Com. Ex. 1 | Com. Ex. 2 |
|---|---|---|---|---|---|---|
| Separating agent | Separating agent 4-1 | Separating agent 4-2 | Separating agent 4-3 | Separating agent 4-4 | Separating agent 5 | Separating agent 6 |
| Bonding method of polysaccharide derivative | Bonding in solution | | | Bonding after being carried on silica gel | — | — |
| Catalyst | Absent | Present | Present | Present | — | — |

TABLE 1-continued

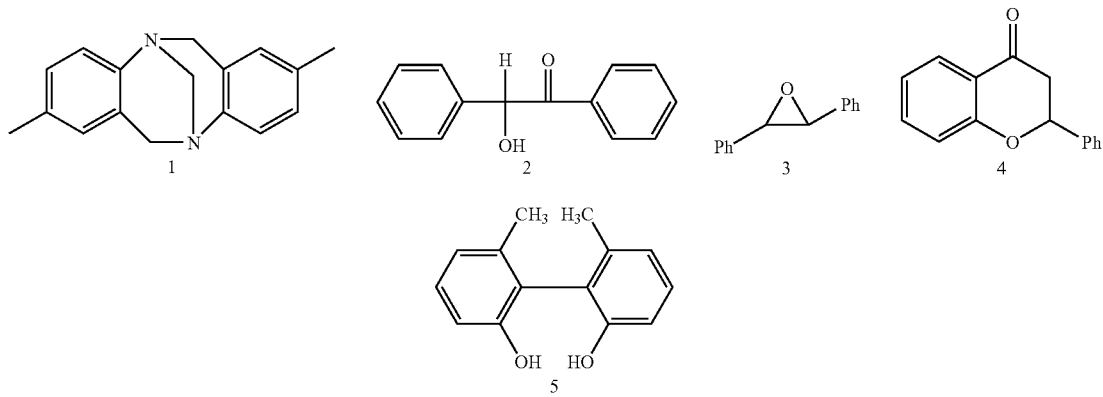

|  | Ex. 1 | Ex. 2 | Ex. 3 | Ex. 4 | Com. Ex. 1 | Com. Ex. 2 |
|---|---|---|---|---|---|---|
| Solvent | Pyridine | Pyridine | Chloroform | Toluene | — | — |
| Bonding ratio of polysaccharide derivative | 5.4 wt % | 4.9 wt % | 4.3 wt % | 4.4 wt % | 11.0 wt % | 10.7 wt % |
| Separation factor ($\alpha$) |  |  |  |  |  |  |
| Racemic modification 1 | 1.31 | 1.31 | 1.30 | 1.31 | 1.26 | 1.27 |
| Racemic modification 2 | 1.17 | 1.13 | 1.20 | 1.21 | 1.09 | 1.10 |
| Racemic modification 3 | 1.50 | 1.19 | 1.45 | 1.38 | 1 | 1 |
| Racemic modification 4 | 1.13 | 1.08 | 1.16 | 1.16 | 1 | 1 |
| Racemic modification 5 | 1.79 | 1.73 | 2.29 | 2.00 | 1.69 | 1.74 |

$\alpha$ = (Retention factor of racemic modification retained more strongly)/(Retention factor of racemic modification retained more weakly)
Flow rate: 0.1 ml/min
Mobile phase: hexane/isopropanol = 98/2 (v/v)

The invention claimed is:

1. A separating agent for enantiomeric isomers, comprising a polysaccharide derivative carried on a porous carrier, wherein the porous carrier has an epoxy group and the epoxy group and part of hydroxyl groups of the polysaccharide derivative are chemically bonded to each other.

2. The separating agent for enantiomeric isomers according to claim 1, wherein the polysaccharide derivative comprises cellulose or amylose.

3. The separating agent for enantiomeric isomers according to claim 1, wherein the polysaccharide derivative comprises a polysaccharide carbamate derivative or a polysaccharide ester derivative.

4. The separating agent for enantiomeric isomers according to claim 1, wherein the porous carrier comprises silica gel.

5. The separating agent for enantiomeric isomers according to claim 1, which is used as a stationary phase for chromatography.

6. The separating agent for enantiomeric isomers according to claim 1, which is used as a stationary phase for continuous chromatography.

7. A method of producing the separating agent for enantiomeric isomers according to claim 1, comprising the step of chemically bonding a porous carrier having an epoxy group and a polysaccharide derivative having hydroxyl groups by reacting the porous carrier and the polysaccharide derivative in an organic solvent under heating.

8. A method of producing the separating agent for enantiomeric isomers according to claim 1, comprising the steps of:
chemically bonding an epoxy group of a porous carrier and hydroxyl groups of a polysaccharide derivative by reacting the porous carrier having the epoxy group and the polysaccharide derivative having the hydroxyl groups in an organic solvent under heating; and
reacting hydroxyl groups of a product formed in the previous step and a compound having a functional group which may react with the hydroxyl groups.

* * * * *